United States Patent [19]
Cohen

[11] Patent Number: 5,911,019
[45] Date of Patent: Jun. 8, 1999

[54] METHOD FOR UPGRADING A HYBRID FIBER COAX NETWORK TO AN ALL FIBER NETWORK

[75] Inventor: Leonard G. Cohen, Atlanta, Ga.

[73] Assignee: Lucent Technologies Inc., Murray Hill, N.J.

[21] Appl. No.: 08/923,713

[22] Filed: Sep. 4, 1997

[51] Int. Cl.[6] ............................. G02B 6/28; H04B 10/20
[52] U.S. Cl. ........................... 385/24; 385/88; 385/89; 385/147; 359/118; 359/167; 359/179
[58] Field of Search ........................... 385/24, 45, 88, 385/89, 147; 359/118, 124, 128, 110, 164, 167, 168, 173, 341, 179

[56] References Cited

U.S. PATENT DOCUMENTS

| 5,285,305 | 2/1994 | Cohen et al. ........................... 359/110 |
|---|---|---|
| 5,321,541 | 6/1994 | Cohen ..................................... 359/127 |
| 5,440,416 | 8/1995 | Cohen et al. ........................... 359/127 |
| 5,528,582 | 6/1996 | Bodeep et al. ..................... 359/113 X |
| 5,615,290 | 3/1997 | Harasawa et al. ...................... 385/24 |
| 5,636,300 | 6/1997 | Keck et al. .............................. 385/24 |
| 5,699,176 | 12/1997 | Cohen ..................................... 359/118 |
| 5,712,936 | 1/1998 | Hoag et al. .............................. 385/24 |
| 5,712,942 | 1/1998 | Jennings et al. ...................... 385/134 |
| 5,778,116 | 7/1998 | Tomich ..................................... 385/16 |
| 5,815,613 | 9/1998 | Fatehi et al. ............................. 385/22 |

*Primary Examiner*—Brian Healy

[57] ABSTRACT

Disclosed is a method for making the transition from a hybrid network into an all fiber network. In the preferred embodiment, the first step is to replace an existing fiber optic/coaxial cable conversion device located at a remote node with an optic distribution device. Secondly, a house optical network unit is installed in a living unit. Finally, a downstream optic fiber is installed between the optic distribution device and the house optical network unit.

7 Claims, 4 Drawing Sheets

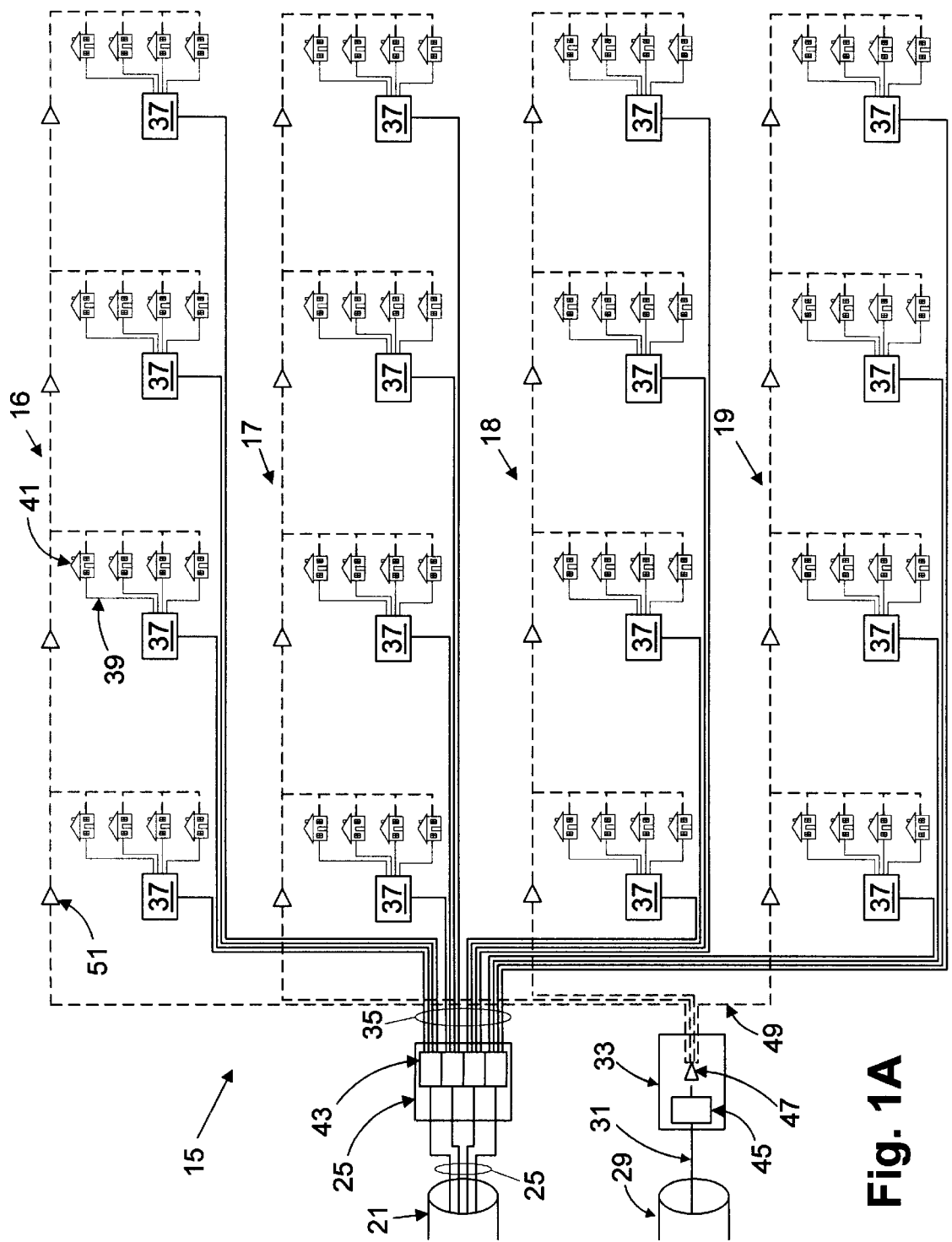

METHOD FOR UPGRADING A HYBRID FIBER COAX NETWORK TO AN ALL FIBER NETWORK

FIELD OF THE INVENTION

This invention relates to the field of optical fiber communication networks and, more particularly, to upgrading hybrid fiber/coax networks.

BACKGROUND OF THE INVENTION

The ability to provide the consumer with a greater number of electronic services has become increasingly important for commercial success in the telecommunications industry. As has recently become the case, the long distance telecommunication exchange companies, the local area exchange companies, and local cable access television (CATV) companies have all sought out the technology to provide multiple media services to the local subscribers, such as an individual or a business. The services sought to be provided by any one of the above concerns includes enhanced pay-per-view, video-on-demand, interactive television, interactive games, image networking, video conversing, video telephony, CATV, and telephone switched services (including ISDN). In order to provide any combination of the above services in an economically viable manner, a distribution network of substantial capacity is required. Capacity, in this sense, refers primarily to the information carrying capability, which is substantially related to the broadcast frequency spectrum bandwidth of the transmission medium. Further, the network must be capable of being upgraded for the next evolution in broadband access architecture.

A transmission medium with the necessary capacity to make the multitude of services desired by consumers is optical fiber. However, it is not economically feasible to deploy an all fiber optic network from central offices to individual residences at one time. Rather, the current telecommunications network is undergoing an evolution in which coaxial cable and two wire pairs are being gradually replaced by fiber optic cable.

During this evolution, a so called hybrid fiber-coax network has been created that employs newly installed fiber cable and existing coaxial cable networks to provide the wide-band services to consumers. Such a network is the subject of a co-pending patent application Ser. No. 08/554,332 of Beecher, et. al., filed Mar. 31, 1998 and entitled "Upgradeable Fiber-Coax Network", now U.S. Pat. No. 5,699,176 the text of which is herein incorporated in its entirety.

Briefly stated, one type of hybrid fiber-coax network employs passive optic components at each fiber-coax distribution node that enables optical fiber to be deployed beyond the fiber-coax distribution nodes alongside the coax distribution network up to up to optical network units substantially located with each existing line extention amplifier (LEA). This configuration may be referred to as fiber-to-the-amplifier (FTTA). Preferably, optic network units (ONU's) are substantially located with the LEA's of the coax distribution network and provide switched telecommunications services by bypassing the LEA's. The coaxial network continues to provide broadcast cable TV.

A second type of hybrid fiber/coax network features passive optic components deployed beyond the fiber-coax distribution nodes alongside the coax distribution network up to optical network units substantially located at each existing line extension amplifier (LEA) as before. From the optical network units, coaxial cable is installed to each living unit. In this configuration, both broadband, narrowband, and switched services may be provided to the subscribers in direct competition with existing services provided via a coaxial network.

However, these hybrid fiber-coax cable networks are still unable to meet the capacity and reliability demands that currently exist and continue to grow into the future. An all fiber network can meet these demands, however, mass deployment is not economically and logistically possible. The existing telecommunications network is vast and will require significant man hours to accomplish a total conversion. Also, business and private consumers have grown accustomed to reliable telecommunications service such that significant disruptions are intolerable. In the case of businesses, an interruption of telecommunications services can cause significant financial loss. Consequently, there is a need for a method to upgrade existing fiber/coax networks into all fiber networks with a minimum of disruption of service to consumers.

SUMMARY OF THE INVENTION

The present invention is a method for making the transition from a hybrid network into an all fiber network. In the preferred embodiment, the first step is to replace an existing fiber optic/coaxial cable conversion device located at a remote node with a passive optic distribution device. Secondly, a fiber optic/coaxial cable conversion device is installed in a living unit. Finally, a downstream optic fiber is installed between the optic distribution device and the second optic fiber/coaxial cable conversion device.

The method of the present invention achieves the transition or conversion with a minimum of interruption of service to individual living units. When performed in non-peak hours, the disturbance is even further minimized.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 1A is a schematic of a first hybrid fiber/coax network;

DETAILED DESCRIPTION OF THE PREFERRED EMBODIMENT

Figure 1B:
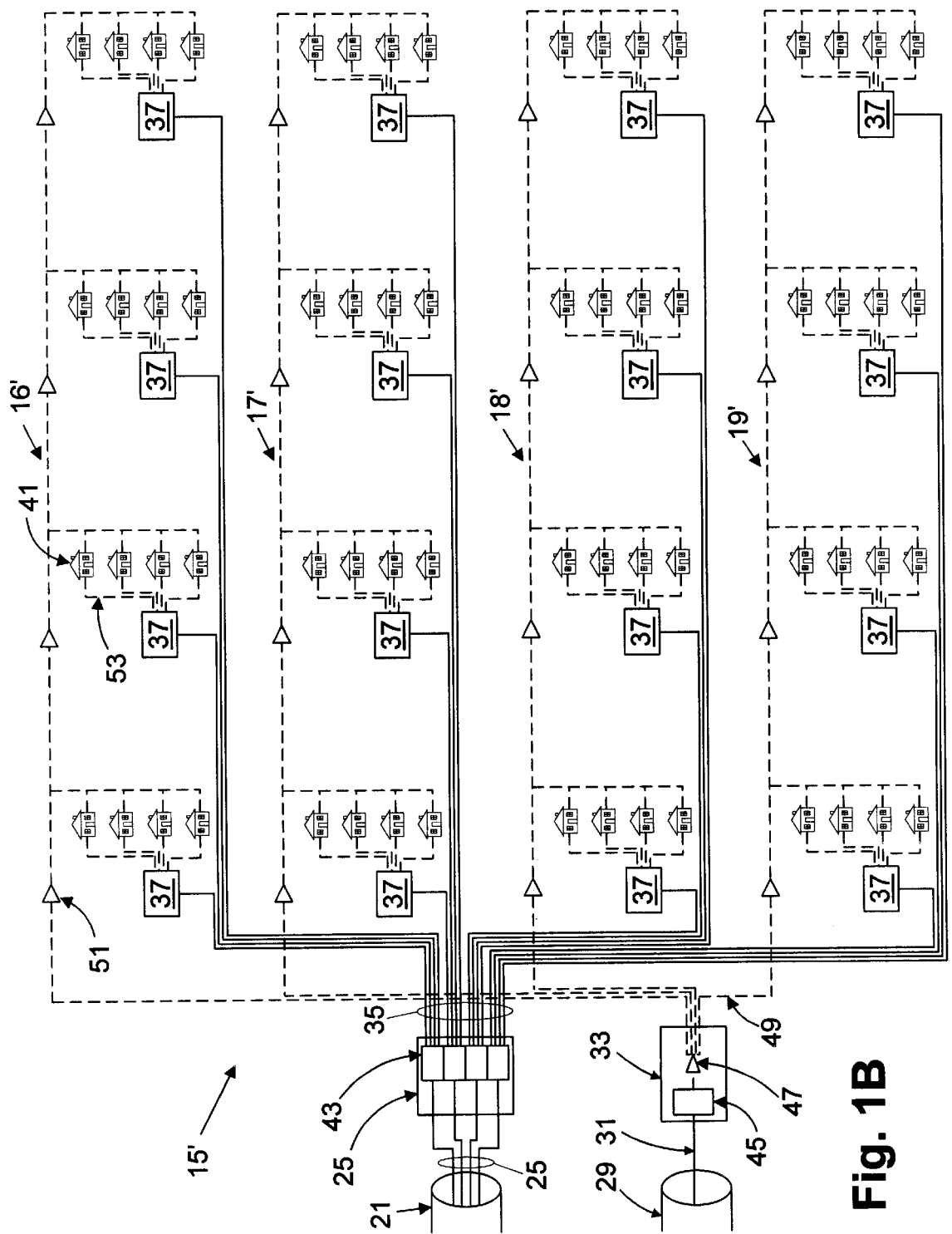
FIG. 1B is a schematic of a first hybrid fiber/coax network.

Shown in FIG. 1A is a first example of a hybrid fiber/coax network 15 with four branches 16, 17, 18, and 19. A feeder fiber cable 21 is routed from a central office houses feeder fibers 23 which are connected to the fiber distribution node 25. A second feeder fiber cable 29 is originating at a central distribution point holds cable feeder fibers 31 to the cable distribution point 33. It would be possible that the two feeder fiber cables 21 and 29 in fact comprise the same cable providing feeder fibers 23 and 31 to both the fiber distribution nodes 25 and the cable distribution point 33.

On the fiber side of the hybrid network, sixteen fibers 35 are then routed from the fiber distribution node 25 to sixteen optic network units 37. The optic network units 37 then convert the signal from a fiber optic signal to an electrical signal which is then sent along local two wire pairs 39 to the living units 41. The term "living unit" as used herein is somewhat of a misnomer as it includes any subscriber who receives services from the hybrid network. This would include private homes, businesses, public entities and others. Within each distribution node 25 are wavelength division multiplexers/power splitters (WDM/PS's) 43 which distribute communications signals among the sixteen fibers 35. The WDM/PS's 43 are similar to those described in U.S. Pat. No. 5,440,416, entitled "Optical Network Comprising a Compact Wavelength-Dividing Component" which issued on Aug. 8, 1995, the entire text of which is incorporated herein.

On the coaxial cable side of the hybrid network, the fiber/coaxial cable conversion device 45 converts the fiber cable signal to an electrical signal. The electrical signal is then routed to the power splitter 47 which sends a common signal to each coaxial cable trunk 49. The electrical signal is then amplified across the coaxial cable network via the line extension amplifiers 49. The amplification of the electrical signal as such is an expedient well known to those skilled in the art.

In the hybrid fiber/coaxial network 15, the optic network units 37 are substantially located with the line extension amplifiers 51. The fiber will facilitate the transmission of switched telecom services. Cable television signals are transmitted through the power splitter 47, coaxial cable trunks 49 and the line extension amplifiers 51 in rf-subcarrier bands along the coaxial cable. The benefit of the hybrid fiber/coaxial cable network 15 is that higher frequency signals can be transmitted through the fiber side of the network 15 to the living units 39 without the use of line extension amplifiers 49 which have a limited bandwidth and would not be able to pass such high frequency signals. Standard R-F amplifiers have limited high-frequency bandwidths (<750 Mhz). Special amplifiers may go to 1 Ghz., but would be cost prohibitive as known to those skilled in the art.

Referring to FIG. 1B, shown is a second hybrid fiber/coax network 15' which is substantially similar to the hybrid fiber/coax network 15 (FIG. 1A) except the two wire pairs 39 (FIG. 1A) have been replaced by coaxial cable 53. In this case, the fiber side of the network can provide all broadband and narrowband services as well as switched telecommunications services. Consequently, the owner of the fiber side may compete with the owner of the cable side to provide cable TV service etc.

Figure 2:
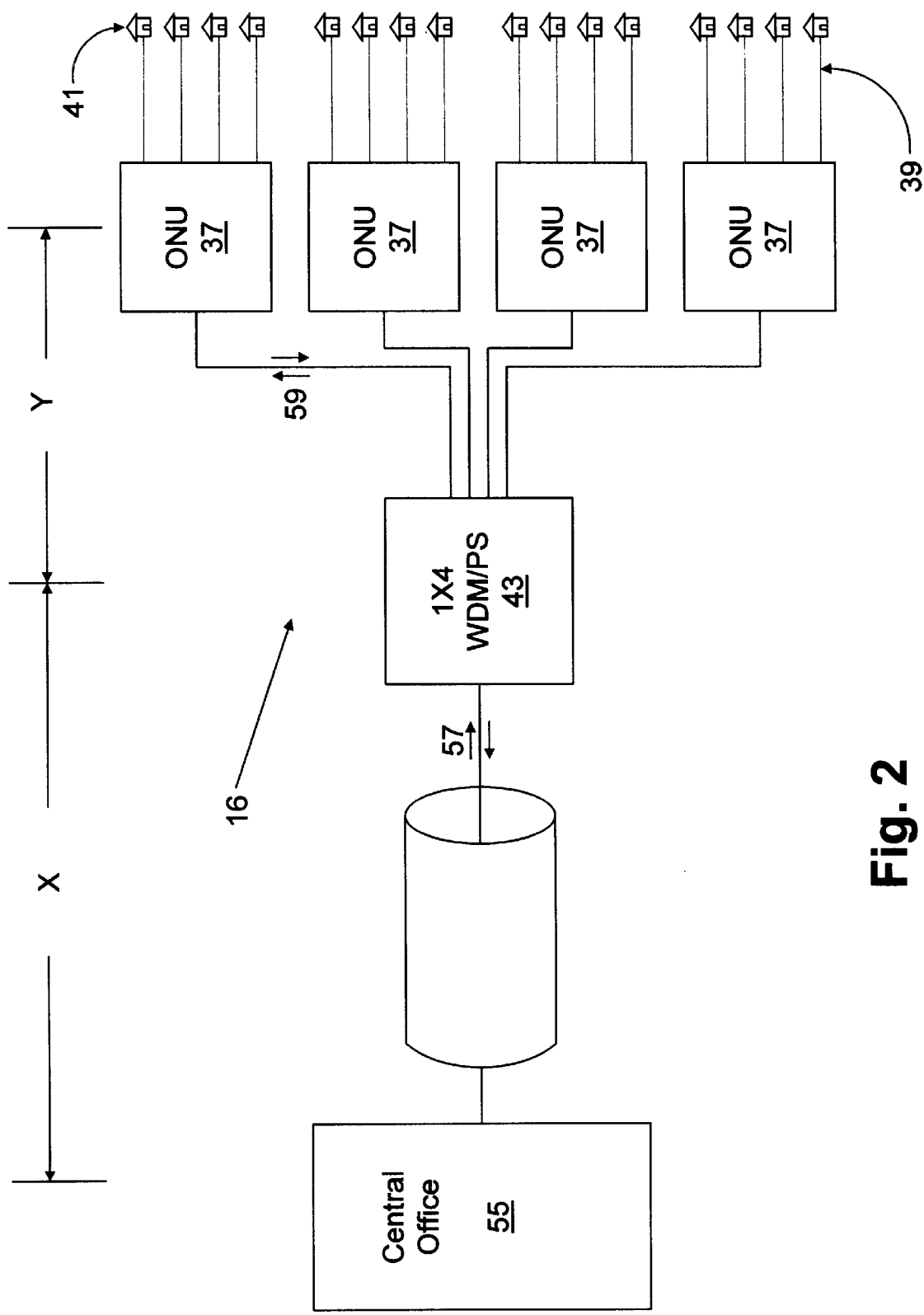
FIG. 2 is a schematic of a single branch of the hybrid fiber/coax network of FIG. 1A.

Turning now to FIG. 2, a view of branch 16 of the hybrid fiber/coax network 15 (FIG. 1A) is shown. Typically, two bands of the frequency spectrum with wavelengths of approximately 1.3 $\mu$m and 1.55 $\mu$m are used to transmit individual voice channels back and forth from the living units 41 to the central office 55. A band in either the 1.55 $\mu$m range is used to transmit a single voice channel from the living units 41 to the central office 55 and a corresponding channel in the 1.3 $\mu$m range is used in the reverse direction or vice versa as known to those skilled in the art.

Beginning at the central office 55, an optic signal 57 which contains sixteen channels of voice and other information as known to those skilled in the art is routed to WDM/PS 43, which may otherwise be known as a remote node. These sixteen channels are then split up into four secondary optic signals 59 which contain four channels of four voices. The secondary optic signals 59 are then converted to an electrical signal and transmitted on to the two wire pairs 39. Each living unit 41 receives all four channels converted by the optic network unit 37.

The physical distance X from the central office 55 to the WDM/PS 43 is generally about ten kilometers and the distance Y between the WDM/PS 43 and the optic network units 37 is generally about one kilometer as known by those skilled in the art.

Figure 3:
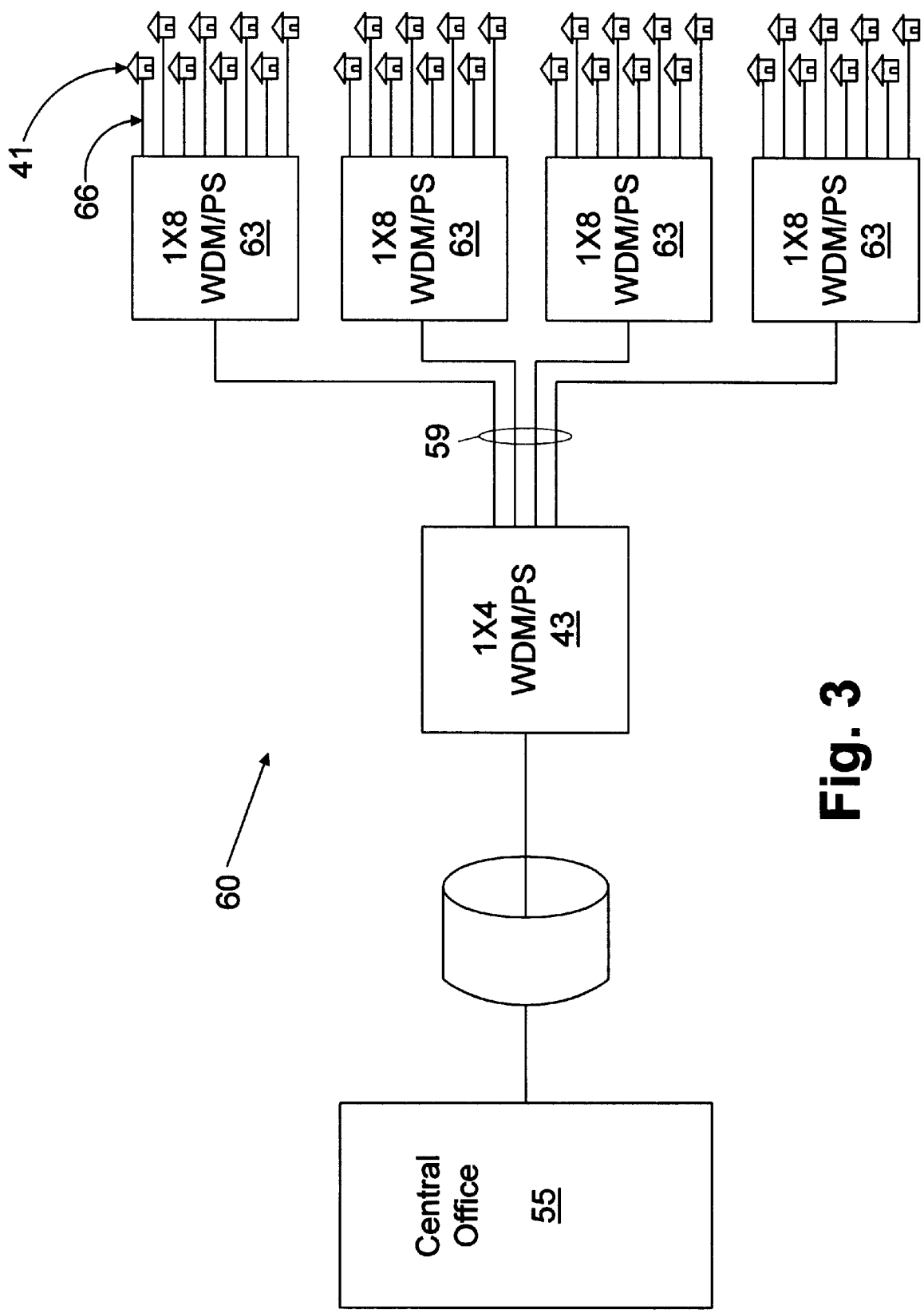
FIG. 3 is a schematic of an all fiber network.

Turning now to FIG. 3, an example of a branch of a fiber optic network 60 is shown. The fiber optic network 60 shown is accomplished by replacing the optic network units 37 (FIG. 2) with the 1×8 WDM/PS's 63. Next, an optic network unit known as a house optical network unit is installed in each living unit 41 to convert the optical signal from the 1×8 WDM/PS's 63 into an electrical signal for use in the living units 41. Finally, a bi-directional fiber optic cable 66 is installed between the optic network units installed in the living units 41 and the 1×8 WDM/PS's 63. Note that the 1×8 WDM/PS's 63 can accommodate eight individual living units 41 as opposed to four living units 41 with the optic network units 37 (FIG. 2). The WDM/PS's 63 are also similar to the 1×4 WDM/PS's 43 which are described in U.S. Pat. No. 5,440,416 which was previously incorporated by reference.

In a second embodiment, the WDM/PS 43 would split the optical signal into eight individual fibers servicing eight 1×4 WDM/PS's 63 which would serve four living units 41.

The all fiber network provides distinct advantages including the fact that each house transmits and receives a unique voice channel rather than living units 41 receiving several channels.

The preferred embodiment of the invention has distinct advantages. In particular, the transition may be accomplished with little disruption of telecommunications service. The existing network need not be disturbed down to the existing optic network units 37 (FIG. 2). In order to minimize disruption, the WDM/PS's 63, fiber cables 66 and house optic network units may be installed while leaving the existing network intact. In particular, the WDM/PS's 63 may be installed next to the existing optical network units 37 (FIG. 2) and the fiber optic cables 66 connected to the WDM/PS's 63. Also, the house optic network units should be placed where they can interface with the existing coaxial cable through which telecommunications are received and transmitted from the living unit 41. The fiber optic cables 66 should then be attached to the optic network unit installed in the living units 41. When all is in place, the upstream fiber optic cable 59 may be disconnected from the optic network unit 37 (FIG. 2) and connected to the WDM/PS 63. Likewise, the house optic network units may be connected to the coaxial cable in the living unit 41. In this manner there is very little disturbance to the telecommunications service received at individual living units. The only steps that interfere with the telecommunications service are those that actually compromise the integrity of the existing system. The final step outlined above might occur during low traffic hours to further minimize interruption of service.

Also, the enclosures which house the optical network units 37 (FIG. 2) are constructed using a modular design in which both the optical network units 37 and the WDM/PS's 63 are essentially interchangeable to facilitate the upgrade.

Many variations and modifications may be made to the preferred embodiment of the invention without departing substantially from the spirit and principles of the invention. All such modifications and variations are intended to be included herein within the scope of the present invention, as defined by the following claims.

I claim:

1. A method for upgrading an hybrid fiber-coax cable network into an all fiber network, comprising the steps of:

replacing a first optic fiber/coaxial cable conversion device located at a remote node with an optic distribution device;

installing a house optical network unit in a living unit; and installing a downstream optic fiber between said optic distribution device and said house optical network unit.

2. The method of claim 1, wherein said step of replacing a first optic fiber/coaxial cable conversion device located at a remote node with an optic distribution device further comprises the steps of:

removing an upstream fiber optic cable from said first optic fiber/coaxial cable conversion device;

removing a downstream coaxial cable from said first optic fiber/coaxial cable conversion device; and connecting said upstream fiber optic cable to said optic distribution device.

3. The method of claim 2, wherein said step of installing said downstream fiber optic cable further comprises:

connecting said downstream fiber optic cable to said optic distribution device; and connecting said downstream fiber optic cable to said house optical network unit.

4. The method of claim 3, wherein said step of installing a second fiber optic/coaxial cable conversion device in a living unit further comprises the step of connecting said house optical network unit to an existing coaxial cable in said living unit.

5. The method of claim 1, wherein said step of installing said downstream fiber optic cable further comprises the installation of a plurality of downstream fiber optic cables.

6. A method for upgrading an hybrid fiber-coax cable network into an all fiber network, comprising the steps of:

placing an optic distribution device proximate to a first optic fiber/coaxial conversion device;

placing a house optical network unit in a living unit;

installing an optic fiber between said optic distribution device and said house optical network unit;

transferring a second optic fiber from said first optic fiber/coaxial cable conversion device to said optic distribution device, said second optic fiber extending from an initial optic distribution device; and establishing a connection between said house optical network unit and a coaxial cable in said living unit.

7. A method for upgrading an hybrid fiber-coax cable network into an all fiber network, comprising the steps of:

replacing an optic network unit with a power-splitting (PS)/wavelength division multiplexing (WDM) device;

connecting living units to said PS/WDM device with a bi-directional fiber optic cable; and installing a house optical network unit in the living units to interface between coaxial cable in the living unit and said bi-directional fiber optic cable.

* * * * *